(12) United States Patent
Willehadson et al.

(10) Patent No.: US 7,739,364 B2
(45) Date of Patent: Jun. 15, 2010

(54) METHOD AND APPARATUS FOR DYNAMICALLY RECONFIGURING A SERVER SYSTEM

(75) Inventors: Stefan Willehadson, Uppsala (SE); Anders Danne, Kista (SE); Max Blomme, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1416 days.

(21) Appl. No.: 10/504,086

(22) PCT Filed: Jun. 27, 2002

(86) PCT No.: PCT/SE02/01279

§ 371 (c)(1),
(2), (4) Date: Oct. 22, 2004

(87) PCT Pub. No.: WO03/069473

PCT Pub. Date: Aug. 21, 2003

(65) Prior Publication Data

US 2005/0066014 A1 Mar. 24, 2005

(30) Foreign Application Priority Data

Feb. 13, 2002 (SE) .................................. 0200417

(51) Int. Cl.
*G06F 15/173* (2006.01)
(52) U.S. Cl. ........................ 709/223; 709/224; 709/225; 709/226
(58) Field of Classification Search ................. 709/230, 709/220, 221, 203, 219, 238, 218, 223
See application file for complete search history.

(56) References Cited

U.S. PATENT DOCUMENTS

| | | | | |
|---|---|---|---|---|
| 5,200,999 A | * | 4/1993 | Matyas et al. | 380/277 |
| 5,794,207 A | * | 8/1998 | Walker et al. | 705/1 |
| 5,819,030 A | * | 10/1998 | Chen et al. | 709/220 |
| 6,240,454 B1 | * | 5/2001 | Nepustil | 709/229 |

(Continued)

FOREIGN PATENT DOCUMENTS

WO 99/32956 A2 7/1999

OTHER PUBLICATIONS

Choy et al; "Efficiently Extendible Mappings for Balanced Data Distribution"; Algorithmica, 1996, 16: pp. 215-232, (c) Springer-Verlag, New York Inc.

(Continued)

*Primary Examiner*—Jeffrey Pwu
*Assistant Examiner*—Abdelnabi O Musa
(74) *Attorney, Agent, or Firm*—Nixon & Vanderhye P.C.

(57) ABSTRACT

A method and apparatus for dynamically reconfiguring a server system. When a new server configuration is applied, a previous server configuration is saved. When receiving a service request, a first server is selected by using a first scheduling algorithm according to the new configuration. If the selected server is incorrect, a second server is selected by using a second scheduling algorithm according to the saved previous server configuration. User data associated with the received service request is moved from the second server, if correct, to the first server. In this way, stored data will be gradually and dynamically reorganized from the previous configuration to the new configuration in a relatively simple way.

21 Claims, 3 Drawing Sheets

U.S. PATENT DOCUMENTS

| | | | |
|---|---|---|---|
| 6,898,705 B2 * | 5/2005 | Abboud et al. | 713/100 |
| 7,171,662 B1 * | 1/2007 | Misra et al. | 717/177 |
| 2002/0107977 A1 * | 8/2002 | Dunshea et al. | 709/238 |
| 2002/0120724 A1 * | 8/2002 | Kaiser et al. | 709/221 |
| 2003/0056096 A1 * | 3/2003 | Albert et al. | 713/168 |
| 2003/0101245 A1 * | 5/2003 | Srinivasan et al. | 709/221 |
| 2006/0047792 A1 * | 3/2006 | Dharmarajan et al. | 709/220 |

OTHER PUBLICATIONS

Ross; Hash Routing for Collections of Shared Web Cahes, IEEE Network, Nov./Dec. 1997.

Vingralek et al; "Snowball: Scalable Storage on Networks of Workstations With Balanced Load"; Distributed and Parallel Databases 6, pp. 117-156, 1998, Kluwer Academic Publishers, Manufactured in the Netherlands.

U.S. Appl. No. 10/504,128, filed Aug. 11, 2004, Willehadson et al.

* cited by examiner

METHOD AND APPARATUS FOR DYNAMICALLY RECONFIGURING A SERVER SYSTEM

This application is the US national phase of international application PCT/SE02/01279 filed on 27 Jun. 2002, which designated the US and claims priority to SE Application No. 0200417-4 filed 13 Feb. 2002. The entire contents of these applications are incorporated herein by reference.

TECHNICAL FIELD

The present invention relates generally to a method and apparatus for reconfiguring a server system comprising a plurality of servers for providing communication services. In particular, the server system is reconfigured dynamically such that shut-down periods for one or more servers can be avoided or at least be minimised.

BACKGROUND

A multitude of different fixed and mobile telecommunication/datacommunication services have been developed, in addition to traditional voice calling and short text messaging. For example, Internet browsing has rapidly become very popular, and in recent years the wireless domain has converged with the Internet. Mobile terminals are now available having functionality for connecting to the Internet over a wireless access network to obtain information and services from sites and servers located anywhere throughout the world.

Moreover, new technologies for mobile communication are introduced, providing greater network capacity and higher transmission bit rates. In particular, GPRS (General Packet Radio Service) and WCDMA (Wideband Code Division Multiple Access) networks are currently emerging for enabling wireless data services that require a wide range of different data rates. The data communicated in many new services may include voice, text, images, audio files and video files in various different formats and combinations.

By way of example, mobile instant messaging, commonly known as "chatting", and presence services are rapidly becoming popular. Instant messaging is known from the world of fixed PCs (Personal Computers), including message status reporting and various group and contact list features. Presence services involve information on the location of mobile terminals and enable users to receive messages according to their profile and availability. A user profile can be personal and may be defined by preferences, interests and hobbies, as well as more temporary factors, such as user availability and current moods. Messages and content services can also be delivered depending on the present location, availability and terminal capabilities. It can be readily understood that such services require the storage of considerable amounts of retrievable user-specific data, which in many cases need to be frequently updated due to their dynamic nature.

The demands for telecommunication services are thus increasing rapidly, and service providers are established all over the world, equipped with hardware and software resources to meet these demands. In particular, means for processing service requests and data, as well as means for storing huge amounts of data are needed. Consequently, a service provider must be able to efficiently control the processing and storing means which typically comprise a system of different service components such as servers. The expression "server" will be used hereafter to represent any hardware and/or software for storing and/or processing data. A server may be configured to provide one or more specific services.

For an Internet service provider or the like controlling a plurality of servers, processing and storing load must be distributed over the servers. This is necessary in order to efficiently utilise available computing and storing resources, and to handle hotspots and avoid bottlenecks. As mentioned above, large amounts of data must be stored and should also be easy to find and retrieve.

As seen from the examples of services given above, different types of stored data may be of a very dynamic nature, needing frequent updating. Moreover, server systems must be reconfigured from time to time as the processing and storing load change, e.g., due to changing demands of service requests, added or removed subscribers and the introduction, modification or deletion of services. The workload on servers may increase rapidly so that individual servers are easily overloaded, at least for a short time, in particular popular web servers. To overcome overloading problems in servers; basically two solutions are available.

Firstly, an existing server may be upgraded to increase its computing and/or storing capabilities. However, the server will soon become overloaded again if the amount of service requests and/or needs for data storage continue to increase. Further upgrading is then required, which can be complex and costly to perform.

Secondly, it is possible to add further servers to meet a higher load. The concept of virtual servers has been proposed to provide load sharing between plural servers. A virtual server is a scalable server built on a cluster of real servers, which is transparent to end users such that the users see only a single virtual server. The front-end of the real servers is a node, sometimes referred to as a "load balancer", configured to schedule service requests to the different real servers. Incoming service requests may involve processing tasks and storing tasks to be performed by the servers. Scalability can thus be achieved by transparently adding or removing servers in the cluster.

However, it is a problem to efficiently distribute processing and storing tasks between a plurality of servers, yet enabling easy retrieval of stored data. "Processing tasks" may involve analysing service requests, processing of data and running certain applications for delivering requested services. "Storing tasks" may involve storing new client-specific, session-specific or configuring data, updating already stored data, and retrieving stored data. For example, a service request may require the retrieval of certain data which is used as input for executing a specific processing task or service application. Client data and session data is hereafter collectively referred to as "user data".

In current solutions involving the distribution of processing and storing tasks, a server is often allocated to a client upon a login request. The allocation scheme used for selecting a server is normally based on the current load on a predetermined set of servers, such that the server having the lowest current load, with respect to memory resources and/or CPU (Central Processing Unit) capability, etc, is selected for a client or session. Server allocation is typically performed by using a central load manager node or the like. Stored user data must then be retrievable, i.e. it must be possible to find the server in which the searched data was stored.

The most simple current solution for selecting a server is to use a "Round Robin" allocation scheme. Further load sharing solutions are known which are more complex, such as "Weighted Round Robin", "Least Connection", "Weighted Least Connection", "Locality Based Least Connection", "Destination Hashing" and "Source Hashing".

However, the solutions mentioned above are relatively complex to use, resulting in problems related to supervision, operation and maintenance, since it is difficult to predict where data will be distributed and stored. Furthermore, it may be difficult to find and retrieve data being stored in one or more servers if no reference or pointer to the data is stored as well. A client performing a login may have a proper reference to the data, but no other client or device can find and retrieve the data without the reference, unless so-called "brute force searches" are used among a set of servers.

"Round Robin" scheduling is only suitable for distributing processing load, since processing tasks are not affected by in which server they are performed. On the other hand, retrieving stored data in one of more servers carrot be done by using Round Robin but requires the use of specific pointers or references as described above. Furthermore, a common basic problem with some of the other scheduling methods mentioned above is that they use is (Internet Protocol) addressing for scheduling. Since a plurality of clients can reside behind a single IP address (proxy, NAT, etc.), these can neither be used for data distribution nor load sharing.

Storing tasks are therefore preferably scheduled by means of a hashing algorithm using some client or session identity as input. The hashing algorithm then provides a number identifying a selected server. If the same hashing algorithm is used again when retrieving data on a later occasion for the same client or session, the same server will be selected, provided that the servers have not been reconfigured since the searched data was stored. Thereby, the need for using specific pointers or references is eliminated.

However, if the number of servers and/or the identities of individual servers are changed in a reconfiguration operation, the hashing algorithm will most probably not provide the correct server identity anymore, if user data for a specific client or session was stored before the reconfiguration was made. A current solution for avoiding this problem is to shut down the server system from service requests for modifying the hashing algorithm and moving stored user data between servers, such that server selection becomes correct. This is a quite cumbersome and time consuming operation, which is undesirable since service requests cannot be attended meanwhile, resulting in lost revenue for the service provide. Moreover, the reconfiguration operation is relatively complex involving a considerable risk for errors.

SUMMARY

The object of the present invention is to reduce or eliminate the problems outlined above, and to provide dynamic and efficient reconfiguration of a server system during simultaneous handling of service requests. Thereby, shut-down periods for one or more servers can be avoided, or at least be minimised.

These objects and others are obtained by providing a method and apparatus for dynamically reconfiguring a server system. The server system comprises a plurality of servers being capable of performing at least one common storing task, and a scheduling unit configured to select servers for handling incoming service requests.

A new server configuration is applied, and a previous server configuration is saved. When a service request is received, a server is selected for handling the received request by using a first scheduling algorithm according to the new configuration. If the selected server is incorrect, a server is selected in a second attempt by using a second scheduling algorithm according to the saved previous configuration. If the correct server is selected by the second scheduling algorithm, user data associated with the received service request is moved from the selected server to the server selected by the first scheduling algorithm. If the selected server is also incorrect in the second attempt, a server can be further selected by using a scheduling algorithm according to a saved even earlier configuration.

Preferably, the scheduling algorithms are hashing algorithms. Using the hashing algorithms may include deriving a hash number from a user ID and calculating a server ID number from the derived hash number. The following algorithm may then be used:

$$\text{server ID} = \text{hash}(\text{user ID}) \bmod n \qquad (1)$$

where n is the number of possible servers, and the modulo operator providing an integer between 0 and n−1. The new configuration may involve a changed number of servers, and in the second scheduling algorithm, n is then changed accordingly from the first scheduling algorithm.

The service requests may involve storing tasks such as storing new data, updating already stored data, and retrieving stored data.

Applying a new server configuration may further include storing new configuration data in a central administrator or the like, which can be accessed by the servers. Each server may comprise a local administrator or the like, being adapted to receive new configuration data from the central administrator. New configuration data can be pushed from the central administrator to the servers, or be retrieved by sending a request from a server. The central administrator may comprise means for pushing new configuration data to one or more servers. Further, the local administrator may comprise means for sending a request for new configuration data to the central administrator.

The procedure may further be executed using a computer program comprising a software code being adapted to perform the method in a server system.

The technology described here is capable of simultaneously handling a dual configuration of a server system. When the system is to be reconfigured by adding and/or removing one or more servers, the previous old configuration is saved. Thereby, requested data can be retrieved by using the old configuration, if the requested data could not be found by using the new configuration.

Stored data is gradually and dynamically re-organised from the old configuration to the new one with a minimum of impact on the system operation. A better distribution of data may also be achieved when reconfiguring a server system, since data associated with new users or sessions can be efficiently distributed on existing servers as well as on any new added servers.

DETAILED DESCRIPTION

Figure 1:
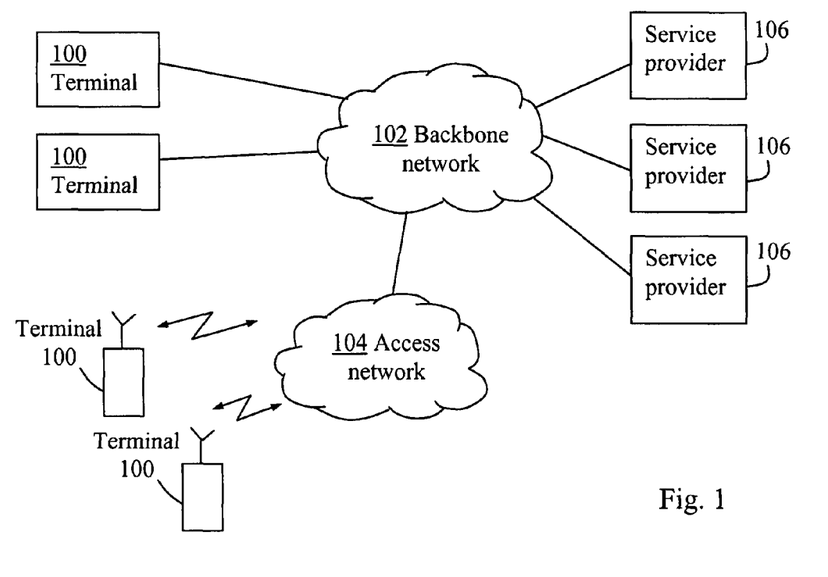
FIG. 1 is a schematic overview of a communication scenario.

In FIG. 1, a schematic communication scenario is illustrated in which the present invention can be used. A plurality of client terminals 100 are connected to a backbone network 102, such as the Internet. The client terminals 100 may be fixed or mobile, such as wired terminals, or wireless terminals connected to a mobile access network 104 over an air interface, as Indicated in the figure. A plurality of service providers 106 are likewise connected to the backbone network 102, each comprising one or more servers for executing telecommunication services requested for the client terminals 100. In reality, various further networks and/or nodes are typically involved in communication routes between clients and service providers, although not shown here for the sake of simplicity.

A client terminal 100 may initiate a specific telecommunication service by sending a service request over the backbone network 102 to a service provider 106. The contacted service provider then activates one or more suitable service applications in response thereto. Activating a service application may involve various processing and storing tasks, as performed in one or more servers. A service application may also be triggered without a preceding terminal request, such as through a "push" mechanism as used for example in the context of WAP (Wireless Application Protocol). A service request may thus originate from another service provider or network operator, e.g. needing user data of a certain client or ongoing session. For example, a service provider may want to transmit certain information to mobile stations as they enter a specific area. In that case, the service provider will request needed user data, such as terminal capabilities and client profile, e.g., including predefined preferences and interests.

As mentioned earlier, service providers are typically equipped with a plurality of servers in order to handle service requests from clients and other service providers. Thus, the same functionality is duplicated in several servers, thereby being capable of performing the same or similar service tasks simultaneously for plural clients, be it processing or storing tasks. The technology described in this case enables efficient reconfiguration of plural servers such that any shut-down periods can be avoided or at least be minimised.

Figure 2:
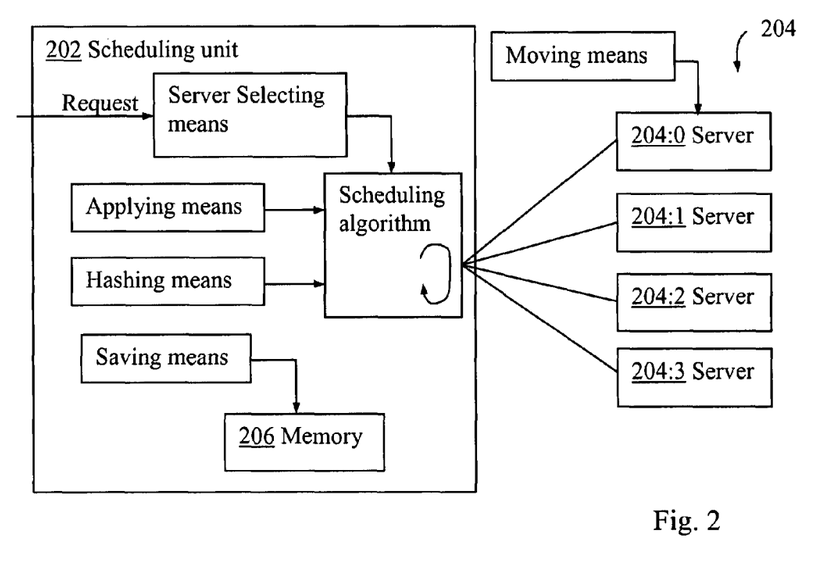
FIG. 2 is a block diagram of an exemplary server system according to one example embodiment.

In FIG. 2, a simplified server system 200 is illustrated for providing one or more telecommunication services for client terminals. The server system 200 comprises a scheduling unit 202 for scheduling incoming service requests involving one or more storing tasks. The scheduling unit 202 is connected to a set of servers 204 that are capable of performing at least one common storing task. The servers 204 may in addition be capable of performing other tasks or operations as well, which is however not within the scope of the present invention. The servers 204 may further be designated for different service applications, and may comprise for example Session servers, Instant Messaging servers, Presence servers etc. The server system 200 may also include further components such as access nodes and different servers designated for different request handling operations.

The scheduling unit 202 may reside in an access rode of a service provider, receiving service requests from clients, service providers or network operators. The scheduling unit 202 may also reside in a processing server being configured to forward certain service requests to other servers for further treatment.

The scheduling unit 202 is configured to use scheduling algorithms for selecting specific servers 204 for incoming service requests, using some predefined client or session identity as input. A scheduling algorithm then provides a number identifying a selected server. The scheduling algorithm provides that when stored data for a client or session is retrieved, the correct server will be selected, if the number of servers 204 and their identities are the same as when the searched data was stored. Further, if a storing task involves storing new user data, the scheduling algorithm will provide that the new data is stored in the same server as old user data was stored, thereby collecting all user data for a specific client or session in the same server.

The scheduling algorithms used are preferably hashing algorithms. A hashing algorithm means that a hash number is derived from a predetermined identity code of a client or a session, which will hereafter be collectively referred to as a "user ID". A server identity can be determined by calculating a corresponding server ID number by means of a predetermined algorithm or formula based on the derived hash number. For example, the hash number can be a simple checksum or the like for a binary code of the user ID. According to one example, a server 204 is determined to perform a storing task from the following algorithm:

$$\text{server ID}=\text{hash(user ID)}\,\text{modulo}\,n \quad (1)$$

where n is the number of possible servers in the set. The modulo operator will provide an integer between 0 and n−1. For example, if four secondary servers 204:0-204:3 are available, i.e. n=4, and one particular client gives hash(user ID)=14, the server ID=2. Thus, server 204:2 is selected accordingly. For another client, hash(user ID)=16, leading to server ID=0, and so forth. Any suitable hashing function may be used on a user ID, provided that the same server ID is always derived from the same user ID. In this way, storing load can be distributed in the set of servers 204.

However, if the server system needs to be reconfigured by changing the number of servers, the used hashing algorithm must also be modified in order to distribute storing load between the new number of servers. Thus, it may be necessary to add or remove one or more servers due to, e.g., trends of service demands, or changes in subscribers and offered services.

For example, if the above-described hashing algorithm (1) is used, n must be changed according to the new number of servers. Thereby, inputting a user ID in the modified hashing algorithm will most probably provide a different server ID than before.

In previous solutions, a reconfigured server system is shut down for a period of time in order to move storage or user data, or to introduce a specific pointer or reference to the relevant storage place for each affected data entry in she concerned servers. It can be readily understood that this is a tedious and time consuming procedure.

Instead, the dynamic solution presented here allows simultaneous operation of handling service requests, thereby avoiding unwanted shutdown periods. When introducing a new server configuration, the hashing algorithm is modified according to the new configuration, and the old configuration is saved in a memory 206 in the scheduling unit 202. Saving the old configuration includes saving at least the old hashing algorithm and its parameters, and possibly also information on the server system structure of the old configuration.

When receiving a service request involving a storing task for a client or session as identified by a user ID, the scheduling unit 202 makes a first attempt to find the correct server by using the modified new hashing algorithm. If the expected server is not found, i.e. the server where searched data or old user data was stored, the old hashing algorithm according to the saved old configuration is used in a second attempt.

When the correct server is found and selected for the storing task, data associated with the concerned client or session is moved from that server to a new server corresponding to the new hashing algorithm. If the new hashing algorithm happens to select the same server as the old hashing algorithm, the data will of course remain there.

In this way, already stored data can be gradually moved to correct servers in accordance with the new hashing algorithm whenever service requests are received for different clients or sessions. In the course of time, a growing share of the total data amount will end up in correct servers according to the new configuration. Finally, it may be appropriate to shut down the server system during a limited period of time for changing storage of any remaining user data which has not yet been moved. The old configuration can then be deleted from the memory 206.

It should be noted that it is possible to use more than two configuration versions simultaneously in a server system. Thus, further previous configurations of even earlier versions may be saved in the memory 206. In that case, more than two attempts can be made for finding the correct server, by using saved even earlier configuration versions.

Figure 3:
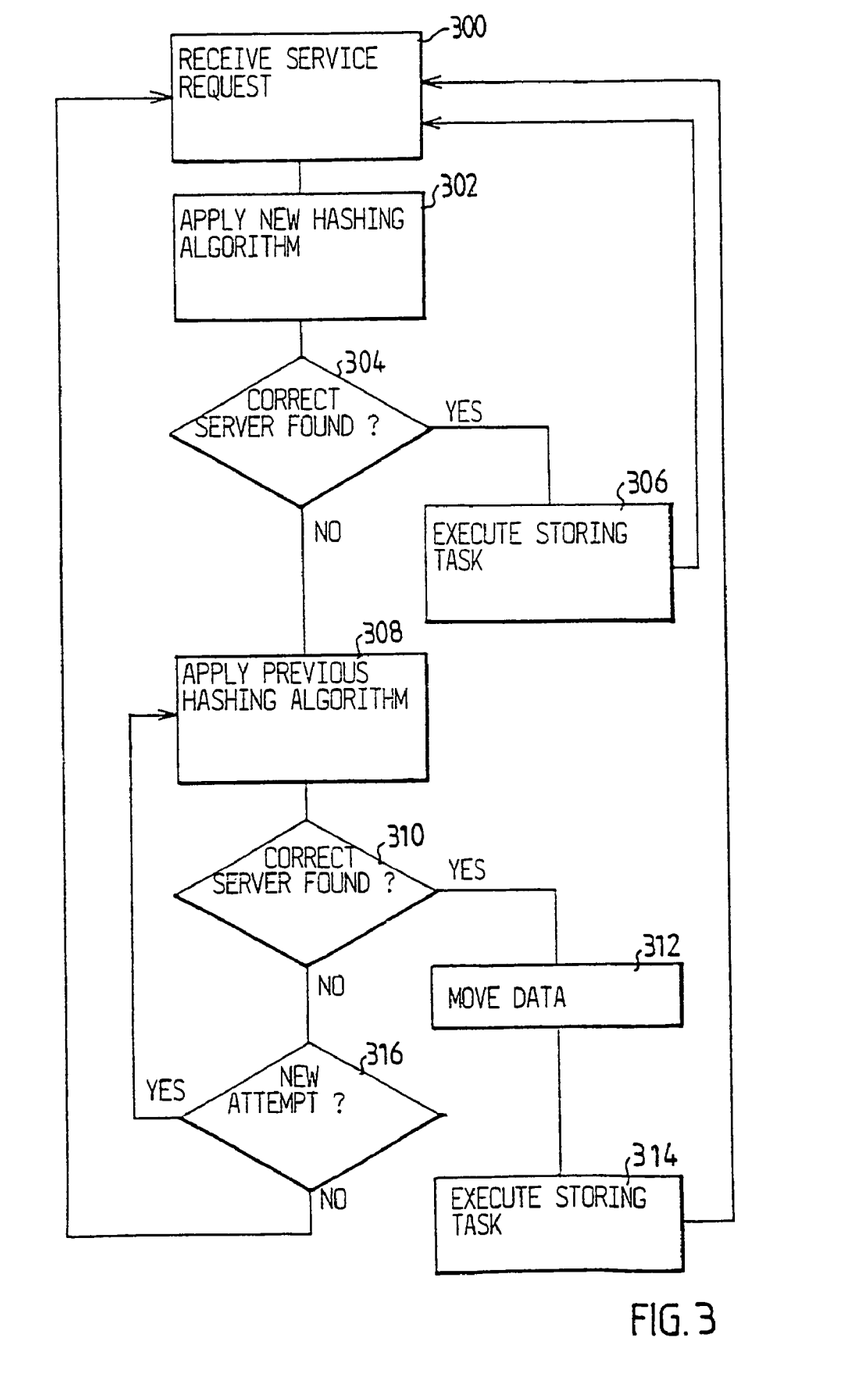
FIG. 3 is a flow chart illustrating a procedure for handling a service request.

An example procedure of dynamically reconfiguring a server system will now be described with reference to a flow chart shown in FIG. 3, occasionally also referring to FIG. 2. It is assumed in this example that the number of servers has been changed and a new hashing algorithm has replaced a previous one, which has been saved in a memory 206. In a first step 300, a service request is received in a scheduling unit 202. It is detected that a storing task must be executed for the service request in one of the servers 204, such as retrieving already stored user data. In a step 302, a first attempt is made to find the correct server where the searched data is stored. The new hashing algorithm is then applied to select a server for the received service request, using a corresponding user ID as input. The user ID can normally be extracted from the received service request.

Next in a step 304, it is determined whether the correct server was found and selected in step 302 by the new hashing algorithm. If so, the storing task can be executed accordingly in a step 306, after which the procedure may return to the first step 300 for receiving a next service request. If it is determined in step 304 that the selected server was incorrect, a second attempt is made to find the correct server in a step 308, by applying a saved previous hashing algorithm on the received service request.

It is then determined in a next step 310, whether the correct server was found and selected in step 308 by the previous hashing algorithm. If so, user data associated with the service request is moved, in a step 312, from the old server to the new server selected in step 302 by the new hashing algorithm. The moved data may embrace all user data of a client or session for which the service request was directed, even if the storing task to be performed is concerned with only some of that data.

The storing task is also executed accordingly in a step 314, after which the procedure may return to the first step 300 for receiving a next service request. It should be noted that steps 312 and 31 can be performed in reverse order, if suitable. For example, it may be efficient to first retrieve searched data in a storing task before moving the data to another server.

If it was determined in step 310 that the correct server was still not selected in step 308, it may be determined in a step 316 whether a new attempt should be made to find the correct server. If so, the procedure returns to step 308 for applying a further previous hashing algorithm, which may be an even older saved hashing algorithm, as explained above. If determined in step 316 that no new attempt is to be made, e.g. due to time-out or count-out, the storing task cannot be performed for the received service request. A new request may then be received by returning to the first step 300.

As mentioned above, reconfiguring a server system may involve changes in offered services. For example, new services may be added and present services may be modified or omitted. In a system with plural servers, such reconfiguration requires that all servers are updated with the new configuration. In previous solutions, relevant new configuration data is stored in all servers. In the present invention, all configuration data may instead be stored in a central administrator or the like, which can be accessed from the servers.

Figure 4:
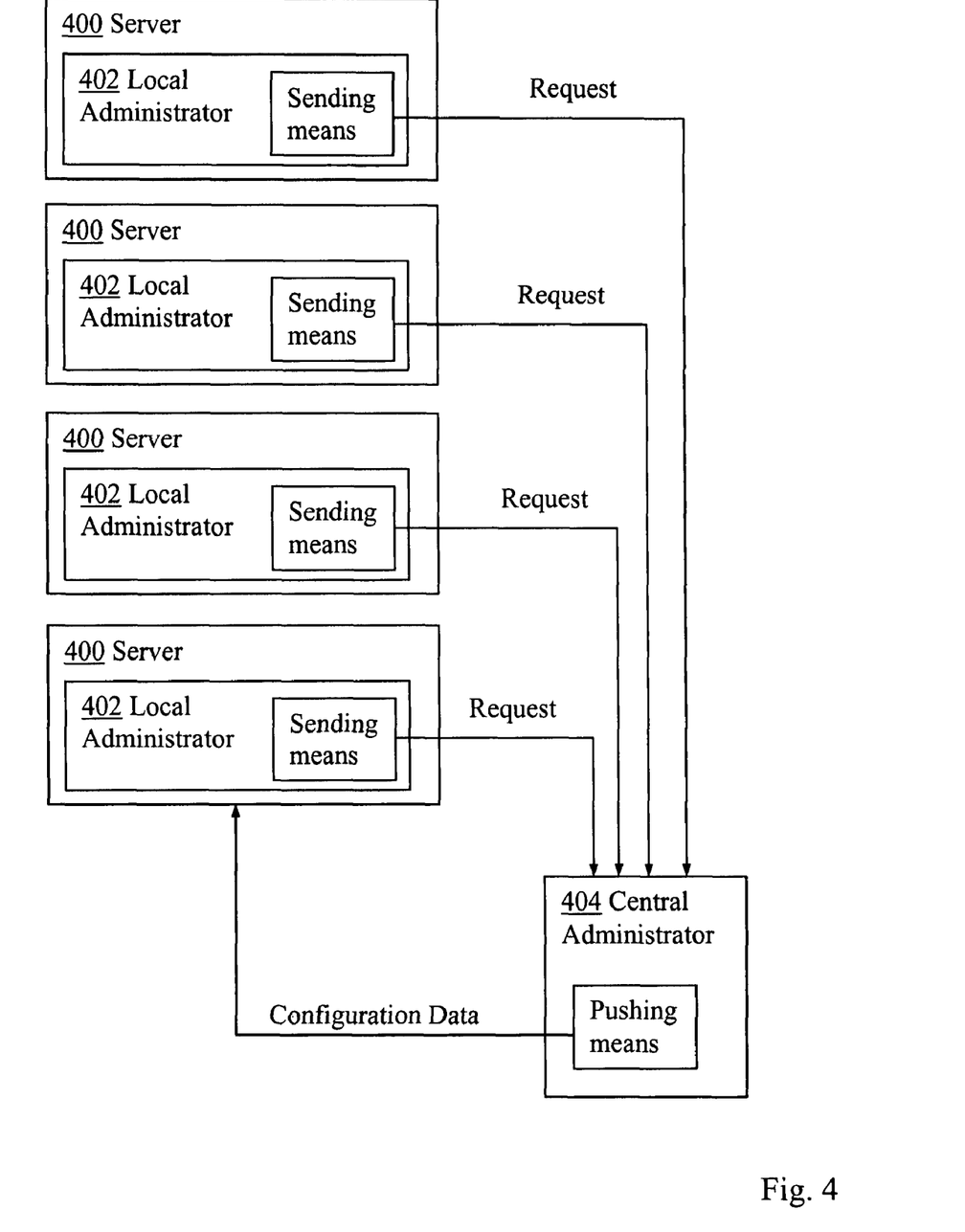
FIG. 4 is a block diagram illustrating centralised administration of configuration data.

In FIG. 4, a schematic block diagram illustrates a centralised administration of configuration data. A group of servers 400 is shown, each being capable of handling at least one common service request, such as the servers 204 in FIG. 2. Each server 400 comprises a local administrator 402 which is connected to a central administrator 404 and having functionality for accessing configuration data there from. The central administrator 404 may be a separate node in the server system or may reside in an access node or in a server, e.g. together with a scheduling unit 202 as described above.

The servers 400 may need access to certain configuration data in order to invoke requested services. However, no such configuration data is stored locally in the servers according to one embodiment. Instead, all configuration data being valid for the servers 400 is stored in the central administrator 404. Thus, any configuration data required for invoking a requested service in a server 400 can be retrieved from the central administrator 404 by sending a request for the configuration data from its local administrator 402. Only a reverence to the central administrator 404 is needed in the local administrators 402. Configuration data can also be "pushed" to one or more local administrators 402 from the central administrator 404, i.e. without a preceding request from the local administrators 402.

By this arrangement, configuration data is efficiently stored in only one place instead of being duplicated in the servers 400. Any updating of configuration data can easily be done in the central administrator 404, which will have an accurate overview of all current services and servers. Errors and conflicts between servers having different configuration versions can thereby be avoided. Moreover, the need for synchronous updates in plural servers is eliminated.

The technology may be used to great advantage in telecommunication services defined in the context of "Wireless Village Server", such as those relating to Instant Messaging, Presence Information and Shared Content. By using the invention in servers for handling such service requests, a dynamic and efficient reconfiguration is achieved for those servers. However, the technology is also applicable to any scalable systems for data distribution. By using this technology, servers can thus be dynamically added and/or removed without shutting down the server system, at least for extensive time periods. In this way, a high level of service can be maintained.

In particular, the technology can advantageously be used in a server system for distributing data storage and processing load between plural servers which is described in Applicant's co-pending U.S. application Ser. No. 10/504,128, filed Aug. 11, 2004. In this solution, a primary server for performing a processing task is assigned using a first scheduling algorithm, which is capable of selecting any primary server. A secondary server for performing a storing task is assigned using a second scheduling algorithm, which is capable of selecting a specific secondary server corresponding to a client involved in that storing task.

While the technology has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A method of dynamically reconfiguring a server system comprising a plurality of servers for handling incoming service requests involving one or more storing tasks, each server locally storing different user data at that server in a first server configuration, comprising the steps of:
   A)—applying a second different server configuration where a number of the servers is different from the first server configuration,
   B)—saving the first server configuration, wherein the following further steps are executed by a service request scheduling unit when receiving a service request:
   C)—selecting a server for handling a received service request by using a first scheduling algorithm according to the second server configuration with a client or session identity of the received service request as input,
   D)—selecting a server by using a second scheduling algorithm according to the first server configuration saved in step B) with the client or session identity as input, if the server selected in step C) was incorrect by not having locally stored user data associated with the received service request, and
   E)—moving user data associated with the received service request from the server selected in step D), using the second scheduling algorithm, if the server selected in step D) is correct having locally stored the user data associated with the received service request, to the server selected in step C) using the first scheduling algorithm.

2. A method according to claim 1, comprising the further step of selecting a server by using a third scheduling algorithm according to a saved even earlier configuration, if the server selected in step D) using the second scheduling was also incorrect.

3. A method according to claim 1, wherein the first and second scheduling algorithms are hashing algorithms.

4. A method according to claim 3, wherein using the hashing algorithms includes deriving a hash number from a user ID and calculating a server ID number from the derived a hash number.

5. A method according to claim 4, comprising wherein the hashing algorithm is:

$$\text{server ID}=\text{hash}(\text{user ID})\bmod n \qquad (1)$$

where n is the number of possible servers, and the modulo operator providing an integer between 0 and n−1.

6. A method according to claim 5, wherein the second server configuration involves a changed number of servers, and that in the second scheduling algorithm, n is changed accordingly from the first scheduling algorithm.

7. A method according to claim 1, wherein the service requests involve storing tasks.

8. A method according to claim 7, wherein the storing tasks include any one or more of: storing new data, updating already stored data, and retrieving stored data.

9. A method according to claim 1, wherein step A) of applying a second server configuration includes storing new configuration data in a central administrator, which can be accessed by the servers.

10. A method according to claim 9, wherein new configuration data is pushed from the central administrator to one or more servers.

11. A method according to claim 9, wherein new configuration data is retrieved from the central administrator by sending a request from a server.

12. An apparatus for reconfiguring a server system, the server system comprising a plurality of servers each being capable of performing at least one storing task, and a scheduling unit configured to select servers for handling incoming service requests involving one or more storing tasks, each server locally storing different user data, wherein the scheduling unit is configured to perform the following:
   apply a second different server configuration where a number of the servers is different from the first server configuration,
   save the first server configuration,
   select a first server for handling a received service request by using a first scheduling algorithm according to the second server configuration with a client or session identity of the received service request as input, and
   select a second server by using a second scheduling algorithm according to the first server configuration, if the first server was incorrect by not having locally stored user data associated with the received service request, and
   wherein the apparatus further comprises means for moving user data associated with the received service request from the second server, if the second server is correct having locally stored user data associated with the received service request, to the first server.

13. An apparatus according to claim 12, wherein the scheduling unit is configured to select a server by using a scheduling algorithm according to an even earlier configuration, if the second server was also incorrect.

14. An apparatus according to claim 12, wherein the scheduling unit is configured to use hashing algorithms as scheduling algorithms.

15. An apparatus according to claim 14, wherein the scheduling unit is configured to derive a hash number from a user ID and calculate a server ID number from the derived a hash number.

16. An apparatus according to claim 15, wherein the scheduling unit is configured to use the following algorithm:

$$\text{server ID}=\text{hash}(\text{user ID})\bmod n \qquad (1)$$

where n is the number of possible servers, and the modulo operator providing an integer between 0 and n−1.

17. An apparatus according to claim 12, further comprising a central administrator for storing new configuration data, which can be accessed by the servers.

18. An apparatus according to claim 17, further comprising a local administrator in each server for receiving new configuration data from the central administrator.

19. An apparatus according to claim 17, wherein the central administrator comprises means for pushing new configuration data to one or more servers.

20. An apparatus according to claim 18, wherein the local administrator comprises means for sending a request for new configuration data to the central administrator.

21. A computer program product comprising a software code stored on a tangible medium for method of claim 1 in a server system.

* * * * *

UNITED STATES PATENT AND TRADEMARK OFFICE
CERTIFICATE OF CORRECTION

PATENT NO. : 7,739,364 B2
APPLICATION NO. : 10/504086
DATED : June 15, 2010
INVENTOR(S) : Willehadson et al.

Page 1 of 1

It is certified that error appears in the above-identified patent and that said Letters Patent is hereby corrected as shown below:

In Column 3, Line 14, delete "carrot" and insert -- cannot --, therefor.

In Column 3, Line 18, delete "use is" and insert -- use IP --, therefor.

In Column 3, Line 42, delete "provide." and insert -- provider. --, therefor.

In Column 5, Line 5, delete "Indicated" and insert -- indicated --, therefor.

In Column 5, Lines 46-48, after "as well" delete ", which is however not within the scope of the present invention".

In Column 5, Line 54, delete "rode" and insert -- node --, therefor.

In Column 6, Line 43, delete "or" and insert -- of --, therefor.

In Column 6, Line 45, delete "she" and insert -- the --, therefor.

In Column 7, Line 55, delete "31" and insert -- 314 --, therefor.

In Column 8, Lines 28-29, delete "reverence" and insert -- reference --, therefor.

In Column 9, Line 17, in Claim 1, delete "request:" and insert -- request, --, therefor.

Signed and Sealed this

Twenty-first Day of December, 2010

David J. Kappos
*Director of the United States Patent and Trademark Office*